United States Patent [19]
Archer

[11] Patent Number: 6,122,485
[45] Date of Patent: *Sep. 19, 2000

[54] METHOD AND SYSTEM FOR CONFIRMING RECEIPT OF A MESSAGE BY A MESSAGE RECEPTION UNIT

[75] Inventor: Michael Archer, Dallas, Tex.

[73] Assignee: MCI Communications Corporation, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/921,531

[22] Filed: Sep. 2, 1997

[51] Int. Cl.$^7$ .............................. H04Q 7/20; H04M 11/00
[52] U.S. Cl. ...................... 455/31.3; 455/412; 455/466; 455/38.1; 340/825.44
[58] Field of Search ................................. 455/31.1, 31.2, 455/31.3, 38.1, 458, 466, 412, 413, 414; 340/825.44, 311.1, 539, 540, 10.1; 375/202

[56] References Cited

U.S. PATENT DOCUMENTS

| | | | |
|---|---|---|---|
| 5,499,266 | 3/1996 | Yokev et al. | 375/202 |
| 5,678,179 | 10/1997 | Turcotte et al. | 340/825.44 |
| 5,748,100 | 5/1998 | Gutman et al. | 455/31.3 |
| 5,940,740 | 8/1999 | Aas et al. | 455/31.3 |

OTHER PUBLICATIONS

"How Paging Works", Motorola, Inc. 1995, 1996.
"Flex(tm) Technology", Motorola, Inc. 1995–1997.
ITP Chapters 1–6, Appendix A–C, Glossary, & References Motorola, Inc, Jun. 5, 1996.
Makosinski, A., "Tutorial: Exploring Cellular and Personal Communication Services", http://www.volksware.com/mobilis/august.95/cellpcs1.htm, http://www.volksware.com/mobilis/august.95/cellpcs2.htm and http://www.volksware.com/mobilis/august.95/cellpcs3.htm, Volksware, Inc. 1995.

*Primary Examiner*—Doris H. To
*Assistant Examiner*—Lester G. Kincaid
*Attorney, Agent, or Firm*—Satheesh Karra

[57] ABSTRACT

A system and method for confirming the receipt of a message by a messaging unit or pager. The system allows a caller to request page confirmation from the service provider. The system uses a caller identifier, entered by the caller at an input source, and a sequential index to store and locate data relating to the page confirmation request in a data structure. A page confirmation message is sent to the pager and the pager immediately sends a confirmation reply message back to service provider. At this point the service provider indicates in the data structure that the page was successful. At any time, the caller can then access the service provider to determine if his message was received by the pager.

24 Claims, 6 Drawing Sheets

METHOD AND SYSTEM FOR CONFIRMING RECEIPT OF A MESSAGE BY A MESSAGE RECEPTION UNIT

BACKGROUND OF THE INVENTION

1. Field of the Invention

The present invention relates generally to the field of communications, including paging, cellular and personal communication services (PCS). In particular, the present invention relates to confirming receipt of a message by a messaging unit, such as a pager.

2. Related Art

A paging service is one type of communication service that is related to the present invention. It is a one-way wireless messaging system which allows accessibility to someone away from the wired communications network.

A basic paging system has several key components. The key components include an input source, a telephone network, such as the public switched telephone network (PSTN), one or more paging terminals, a radio frequency (RF) link system, and messaging units or pagers. The paging system is typically operated by a service provider, or carrier, who typically incurs the cost of building and operating the system. Authorized government bodies, such as the Federal Communications Commission (FCC), license bandwidth to the service provider to operate a paging frequency, or channel, within a regulated geographical area. The geographical area can be either local, regional or national in scope.

As mentioned above, another key component of a paging system is the input source. The input source can be a telephone, personal computer, desktop entry device or an operator dispatch where someone is paid to take and enter a message. The desktop entry device is typically leased or sold by the paging service provider.

A page is sent over the PSTN, another key component of the paging system. Alternatively, a page can be sent in other ways, such as over a private switched network, or directly from a computer to a computer network (such as the Internet). In the United States, Regional Bell Operating Companies are the PSTN providers who own and operate the PSTN. The PSTN provider typically owns a twisted pair of copper wires which connects the input source to a PSTN-owned switch.

The page typically consists of a message, the pager's unique number and any other information required by the paging system. The message consists of information the caller is trying to send to the person carrying the pager. The message typically is either a numeric message, representing a phone number the person receiving the page is to call, or a text message.

The next key component of a basic paging system is paging terminals. Paging terminals serve as an interface to the PSTN switch, or to a private switch if public access is not required. The PSTN views the paging terminal as just another switch. The paging terminal is responsible for receiving, processing, storing and forwarding information from the caller. Additionally, it encodes the page for transmission through the carrier paging system. Typically, an encoder accepts the incoming page, validates the pager number and encodes the pager number and message into the appropriate paging signaling protocol (e.g., FLEX™).

The paging signaling protocol is the root of all paging systems. A protocol is a type of language, or set of rules, that allows information to flow over a telephone network through the airwaves and connect with a pager. These rules control the qualities both the service provider and the caller find important. Such qualities include capacity, latency and signaling speed, pager battery life and data integrity.

One example of a paging signaling protocol is the FLEX™ paging protocol. The FLEX™ paging protocol is a multi-speed, high-performance paging protocol adopted by leading service providers worldwide as a de facto standard. Once data is received from the encoder, the FLEX™ paging protocol organizes the page, which includes the caller's message, into frames of data or a specific sized packet containing bits of data. There are a total of 128 frames in a FLEX™ protocol system, numbered zero through 127. It takes four minutes to transmit all 128 frames regardless of the FLEXTM speed. The transmission of all 128 frames is called a FLEX™ cycle. Since one cycle has a duration of four minutes, 15 cycles may be transmitted in one hour.

The paging signaling protocol is sent to the RF link system via telephone line, RF link or satellite. The RF link system includes the link transmitter and link receiver. The link transmitter sends the page to the link receiver, which is located at various paging transmitter sites along the channel. The paging transmitter translates the paging data into signals and broadcasts the message, or page, across the coverage area on the paging frequency or channel.

The final key component of a basic paging system is the messaging unit or pager. The pager receives the page from the paging transmitter. Each pager has incorporated in it a decoder unit. The decoder is able to recognize the unique code assigned to the pager and rejects all other codes for selective alerting. Pagers can be leased from a paging service provider or purchased through various retailers.

A cellular service is another type of communication service that is related to the present invention. The key components of a cellular system are cell base stations and cellular phones. Each cell base station consists of a transmitter/receiver, controller, and ideally, an omnidirectional antenna resulting in a more or less circular radiation pattern. Each cellular phone consists of a low power transmitter/receiver, antenna and a microprocessor control unit.

The microprocessor control unit, within the cellular phone, samples the available communication channels until it finds one with the best reception. If the base station's strength diminishes during a call, the microprocessor control unit switches, or tunes, the cellular phone to another channel and the transmission is picked up from there. This automatic channel selection is called "handoff," and is normally inaudible to the caller, although it can be deadly to data transmissions.

Each call to a cellular phone is validated through the use of two numbers. Each cellular phone is personalized with an Electronic Serial Number (ESN) specific to the phone, and a Mobile Identification Number (MIN), otherwise known as the cellular phone number. Each call is validated at the base station cell by matching the ESN and the MIN.

A personal communication service (PCS) is another type of communication service that is related to the present invention. PCS is a broad term describing a number of systems and services which enable a caller to communicate anytime, anywhere, and in any form. The basic idea is based on the notion of allocating a single ID called a Universal Personal Telecommunication (UPT) number to a device allowing voice and data communication of any kind, anytime, and anywhere in the world. It is analogous to a Social Security number for communication.

PCS is a very recent byproduct of new digital communication techniques, whose roots are in covert military communications with high immunity to enemy jamming. Because PCS is digital in nature, it can easily handle data, messaging, paging, and in the future, full multimedia access with one device and one UPT.

Communication services need to offer much more than the basic systems described above to remain competitive. For instance, the paging system incorporates useful features into modern pagers such as a variety of alerting methods (e.g. using vibration, flashing lights and different beep tones) and the ability to send alphanumeric messages. Other useful features include group call, duplicate message detection, unread message counter, and message protection that prevents selected messages from being overwritten by incoming messages or erased by mistake.

Today's communication technology does not provide a means for the caller to confirm that a one-way communication message, such as a page, was received by the messaging unit. As mentioned above with cellular services, the automatic channel selection called "handoff" can be deadly to data transmissions. Therefore, the caller has no way of knowing if his message, or page, reached the desired destination. What is needed is a system and methodology for confirming the receipt of a message by a messaging unit, such as a pager.

SUMMARY OF THE INVENTION

The present invention is a system and method for confirming the receipt of a message by a messaging unit (also called a message reception unit), such as but not limited to a pager, telephone, computer, message service, etc. The caller has the option of selecting page confirmation. When the caller selects page confirmation, the caller is asked to enter a caller identifier. The caller identifier is used to identify the caller at a later time. The communication service provider then converts the caller identifier into a first index in a data structure, called the generation index, and uses it to locate a free record.

The record is used to store data relating to the caller's page confirmation request. The data stored in the record contains a second index identifying the record, message text to be sent as part of a page confirmation message to the pager and a confirmation flag to indicate whether the pager has acknowledged receipt of the message. The record also preferably stores other information, such as a CRC (cyclic redundancy code) and a time/date stamp. The second index is called the sequential index. The service provider then returns the sequential index to the caller to be used in conjunction with the caller identifier to determine the status of the message.

The service provider broadcasts the page along with the page confirmation message to the pager over a channel. This broadcast is repeated until a maximum time limit is reached or until the pager contacts the service provider indicating receipt of the message.

Once the pager has received the page confirmation message, it will immediately open a data channel back to the service provider and send back a confirmation reply message. The service provider then searches the data structure to find a record matching information in the confirmation reply message. If a match is found, then the service provider sets the confirmation flag to indicate a successful page.

At any point the caller may check the status of his message by accessing the service provider's system. At this point the service provider will prompt the caller for his caller identifier and sequential index. The service provider will search the data structure using the caller identifier and sequential index to locate a match. If a match is found and the confirmation flag is set to indicate the pager successfully received the message, then the service provider reports a successful page. If the confirmation flag is set to indicate the pager did not receive the message, then the service provider reports an unsuccessful page.

The foregoing and other objects, features and advantages of the invention will be apparent from the following more particular description of preferred embodiments of the invention, as illustrated in the accompanying drawings.

BRIEF DESCRIPTION OF THE FIGURES

The present invention is described in reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The preferred embodiment of the invention is discussed in detail below. While specific components and configurations are discussed, it should be understood that this is done for illustration purposes only. A person skilled in the relevant art will recognize that other components and configurations may be used without parting from the spirit and scope of the invention.

The present invention is a system and method for confirming the receipt of a message by a messaging unit or pager. For purposes of illustration, the invention is described in terms of a paging system. This is done for purposes of illustration only. A person skilled in the art will recognize that the invention may be used in other applications such as cellular or PCS systems. As such, the term page or page message is also more generally herein called a message.

Figure 1:
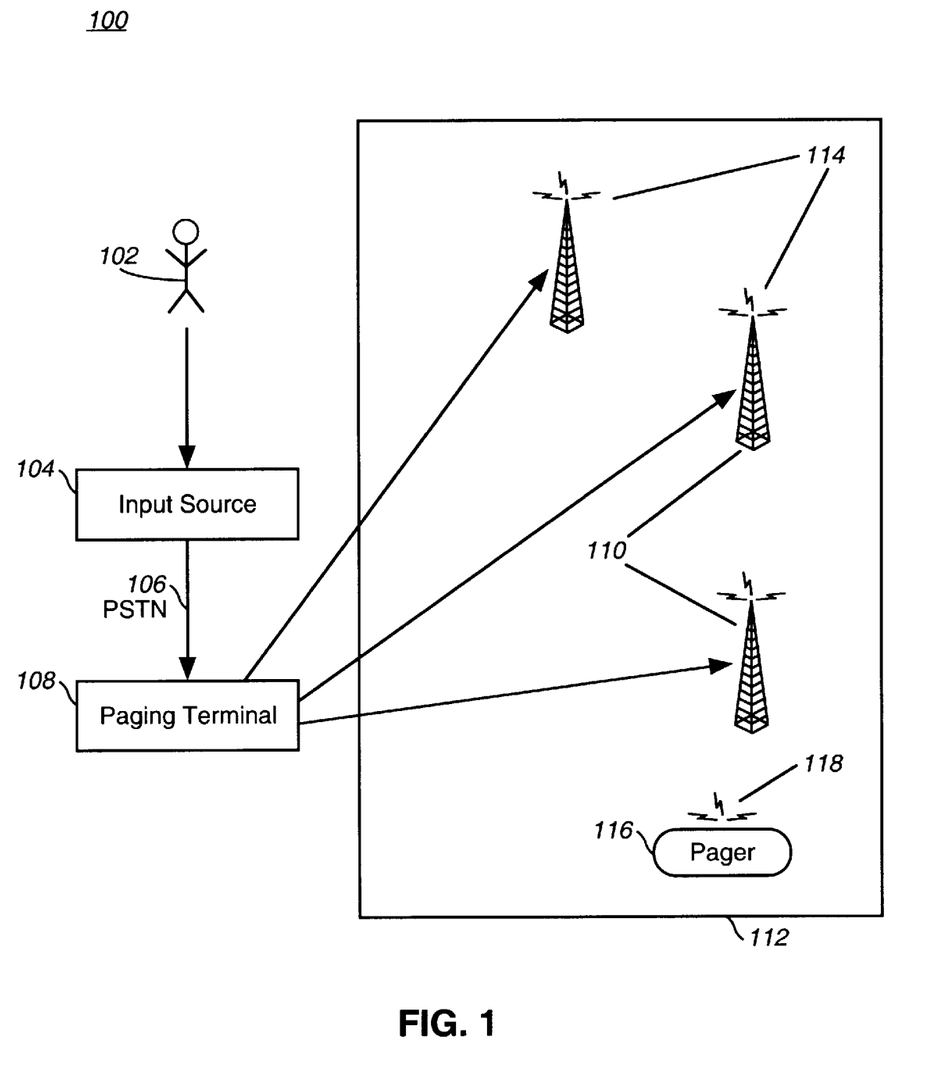
FIG. 1 is a block diagram of the present invention incorporated into a basic paging system.

FIG. 1 is a block diagram of the present invention incorporated into a basic paging system 100. A caller 102 uses one of the above-mentioned input sources 104 or any other well known input source to send the message or page.

The caller 102 typically enters the pager's 116 number into the input source 104. As discussed above, the page typically consists of the message, the pager's 116 unique number and any other information required by the paging system. The message consists of information the caller 102 is trying to send to the person carrying the pager 116. The message typically is either a numeric message, representing a phone number the person receiving the page is to call, or a text message.

The PSTN 106 switches the message to a paging terminal 108 (also called a communication terminal). For convenience, the invention is herein described in the context of the PSTN, but the invention is not limited to this embodiment. The message can be transferred using other means, such as a private switched network or a computer network (such as the Internet).

When a caller 102 dials the pager's 116 number, he is actually dialing into the paging terminal 108 of the service provider who is licensed to operate the paging system 100. Once the paging terminal 108 receives the page (which includes at least the message and pager's 116 number), it processes, stores and forwards information from the caller 102. Additionally, it encodes the page for transmission through the paging system 100. Typically, an encoder accepts the incoming page, validates the pager's 116 number and encodes the number and message into the appropriate paging signaling protocol (e.g., FLEX™).

Once the page is encoded, it is sent to the RF link system (not shown) which includes a link transmitter and link receiver. The link transmitter sends the page to the link receiver, which is located at the various paging transmitter 110 sites. The paging transmitters 110 then broadcast the page across the coverage area 112 on the specified paging frequency or data channel 114. The decoder unit incorporated into each pager 116 will be able to recognize the unique number assigned to the pager 116 and reject all other numbers for selective alerting.

Upon receiving the page with the message, the pager 116 immediately opens a data channel 118 back to the paging terminal 108 to indicate it received the message.

Figure 2:
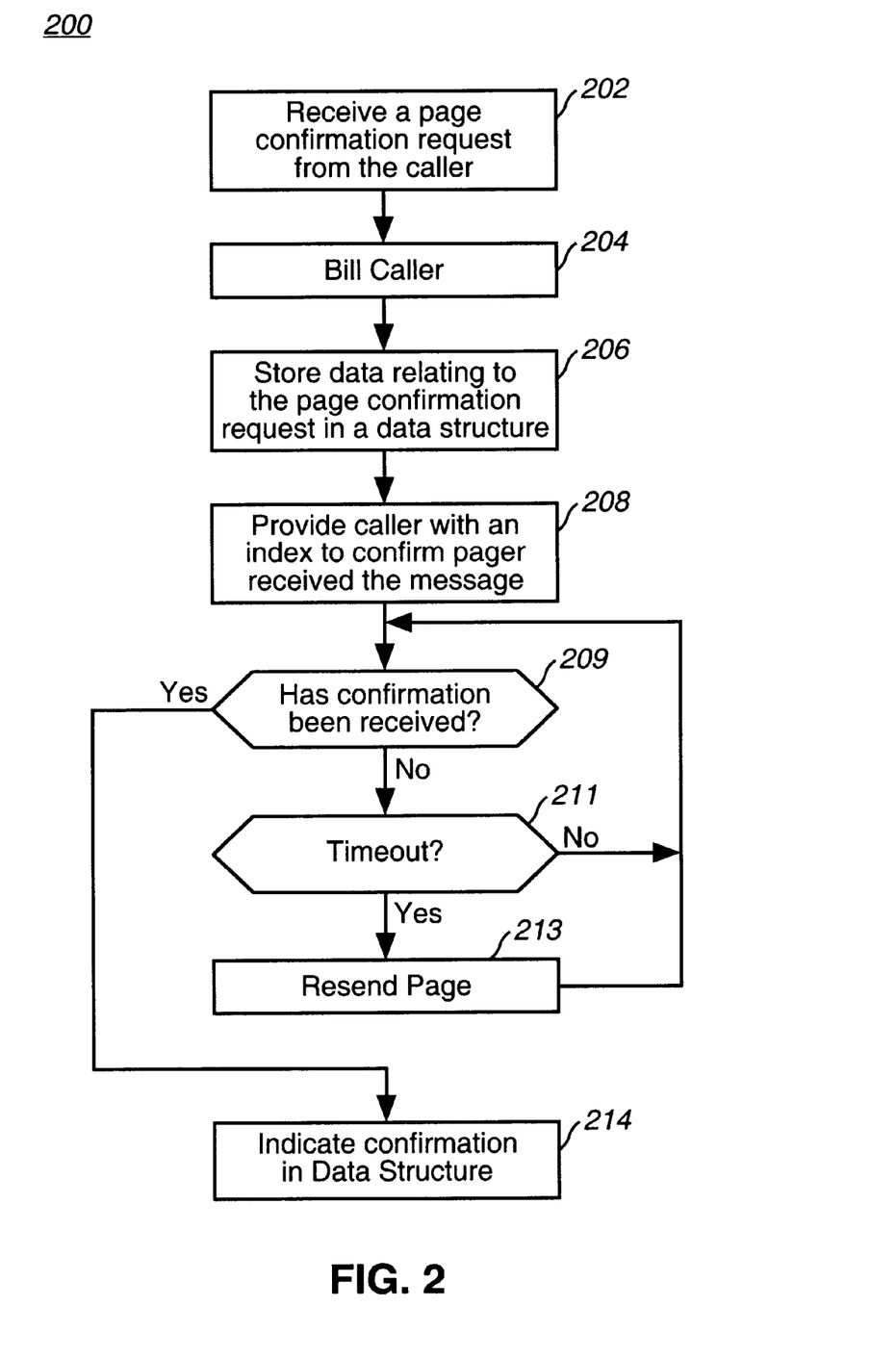
FIG. 2 is a flowchart illustrating a preferred embodiment of the method used in the present invention.

FIG. 2 illustrates a preferred embodiment of the method 200 used in the present invention for confirming receipt of messages. Prior to step 202, the caller 102 uses an input source 104 to dial the pager's 116 number and input his message. Then the caller 102 requests page confirmation. In a step 202, the paging terminal 108 receives a page confirmation request from the caller 102. In an optional step 204, the caller 102 gets billed a nominal charge. In a step 206, information relating to the page confirmation request is stored in a data structure in the paging terminal 108. In a step 208, the caller 102 receives an index into the data structure, from the paging terminal 108, to be used at a later time to confirm whether the pager 116 received the message. The paging terminal 108 transmits the message.

In step 209, the paging terminal 108 determines whether it has received the confirmation from the pager 116. If the paging terminal 108 has received the confirmation from the pager 116, then in step 214 confirmation that the message was received by the pager 116 is stored in the data structure. However, if in step 209 the paging terminal 108 has not received the confirmation from the pager 116, then step 211 is performed.

In step 211, the paging terminal 108 determines whether a timeout has been exceeded. The length of the timeout is implementation dependent. If the timeout has not been exceeded, then control returns to step 209. If the timeout has been exceeded, then the paging terminal 108 retransmits the message in step 213.

Figure 3:
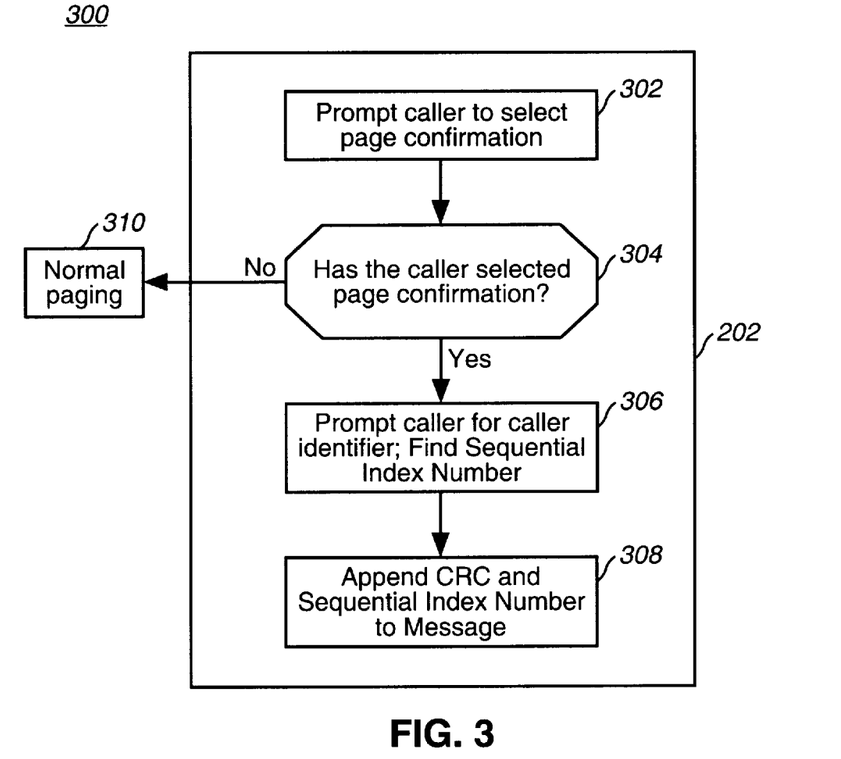
FIG. 3 is a flowchart illustrating how the present invention receives a page confirmation request from a caller.

The manner in which step 202 is performed is represented by a flowchart 300 in FIG. 3. Prior to step 302, the caller 102 enters either a numeric or text message and the pager's 116 number. In a step 302, the caller 102 is prompted to select page confirmation. In a step 304, if the caller 102 selects page confirmation, then in a step 306 the caller 102 is prompted to enter a caller identifier. The caller 102 will use the caller identifier, at a later time, to confirm that the pager 116 received his message. As described more fully below, the paging terminal 108 uses the caller identifier to determine a generation index into a hash table data structure 500 (FIG. 500). The paging terminal 108 then identifies a sequential index to a free record in the hash table data structure 500.

In a step 308, the sequential index and a CRC (cyclic redundancy code) are preferably appended to the message. The CRC is used in a well known process for error detecting/checking performed at both a sending site and a receiving site. The process of generating the CRC is well known. By using the CRC, it is possible for the receiver (in this case, the message reception unit, such as a pager) to confirm that the page confirmation request was received without error.

The CRC is preferably calculated over the message and the sequential index. The resulting data structure (i.e., the message concatenated with the sequential index and the CRC) is called a page confirmation message. This page confirmation message represents what is transmitted from the paging terminal 108 to the pager 116. The pager 116 when transmitting the page may send the page confirmation message alone (since the page confirmation message includes the message), or may send both the message and the page confirmation message.

In step 304, if the caller 102 does not select page confirmation, then step 306 and step 308 are not performed. Instead, step 310 is performed, where the page or other message is transmitted using conventional means.

Figure 4:
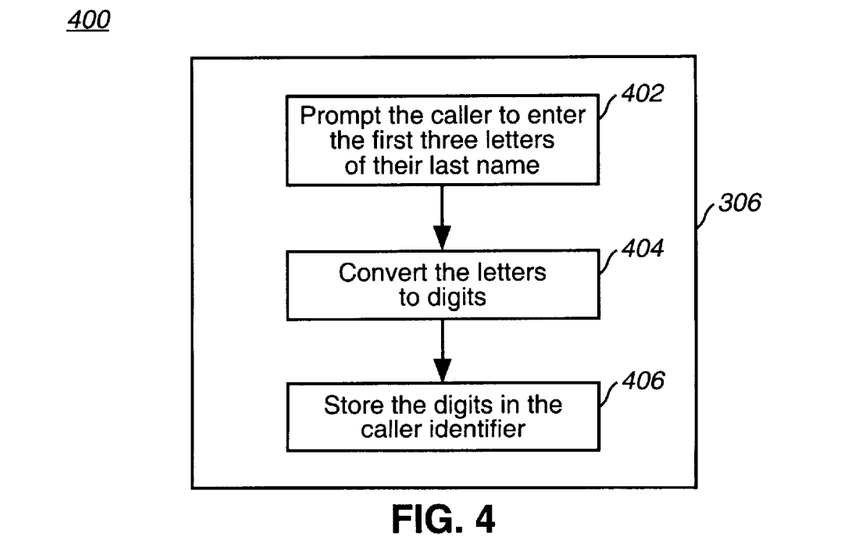
FIG. 4 is a flowchart illustrating how the present invention prompts the caller for a caller identifier.

The operation of step 306 is represented by flowchart 400 in FIG. 4. In a step 402, the caller 102 is prompted to enter the first three letters of his last name. It should be understood that the first three letters of the caller 102's last name is only one example of the caller identifier. The caller identifier can be any other information provided by the caller 102. Preferably, the caller identifier is information that is easily remembered by the caller 102. The caller identifier can be, for example, the caller 102's initials, or any other information that the caller wishes to supply.

In a step 404, the letters are converted into digits. For example, on the keypad of a standard North American touch tone phone, each letter of the alphabet is mapped to a pre-defined digit, where the letters 'Q' and 'Z' could be mapped to zero (0). These digits then represent the caller identifier, as indicated by step 406.

Figure 5:
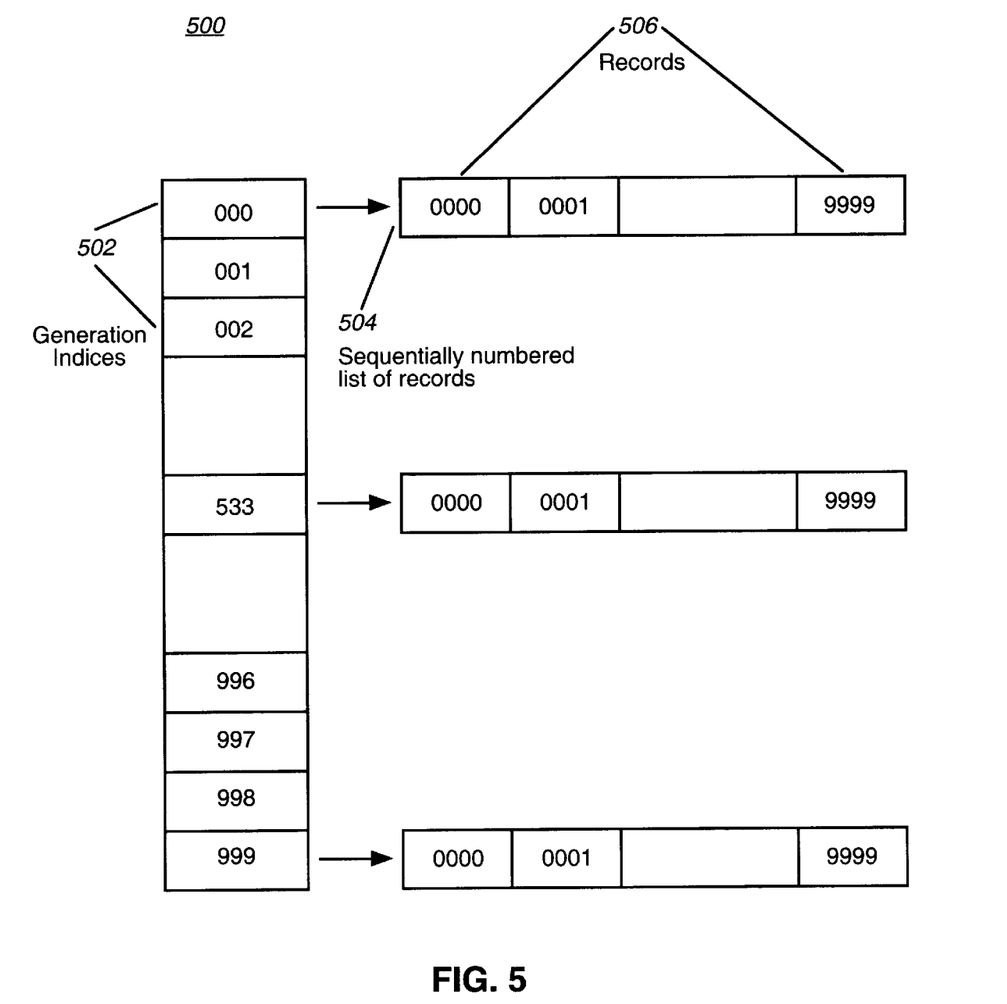
FIG. 5 is a hash table data structure illustrating a preferred embodiment of the present invention, including records storing data relating to a page confirmation request.
Figure 6:
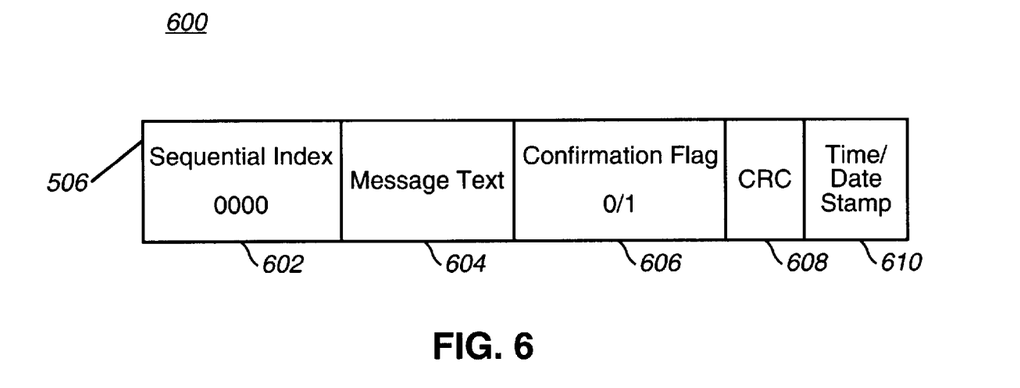
FIG. 6 illustrates the record of FIG. 5.
Figure 7:
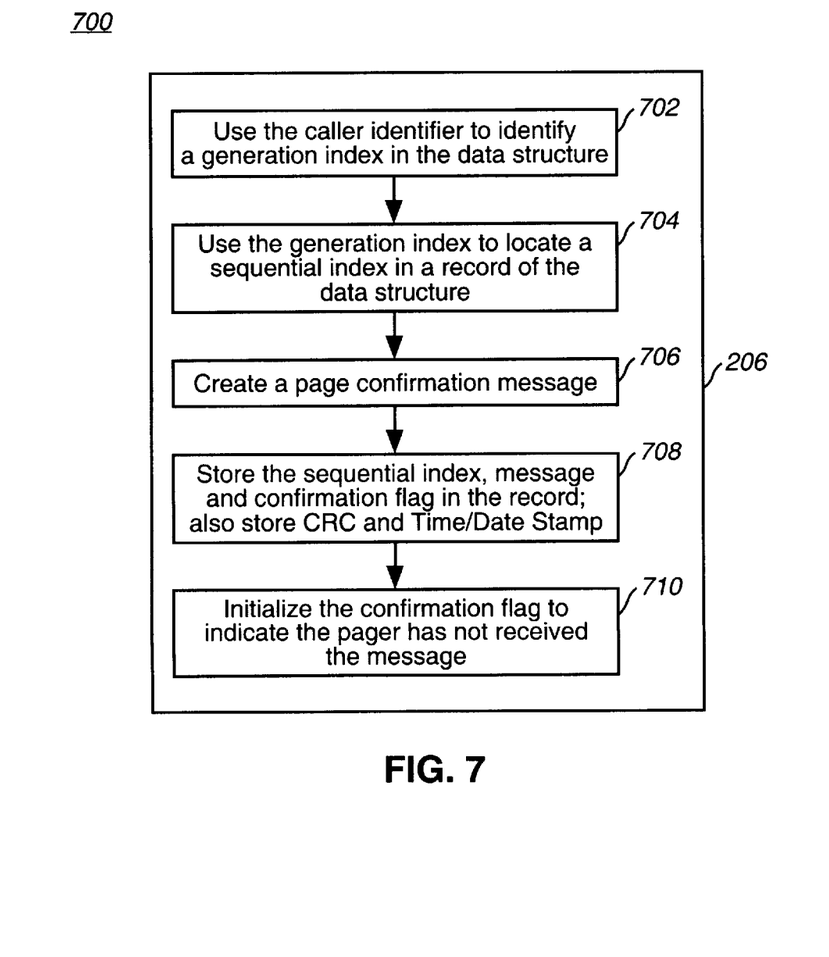
FIG. 7 is a flowchart illustrating how the present invention stores information relating to a page confirmation request in a data structure.
Figure 8:
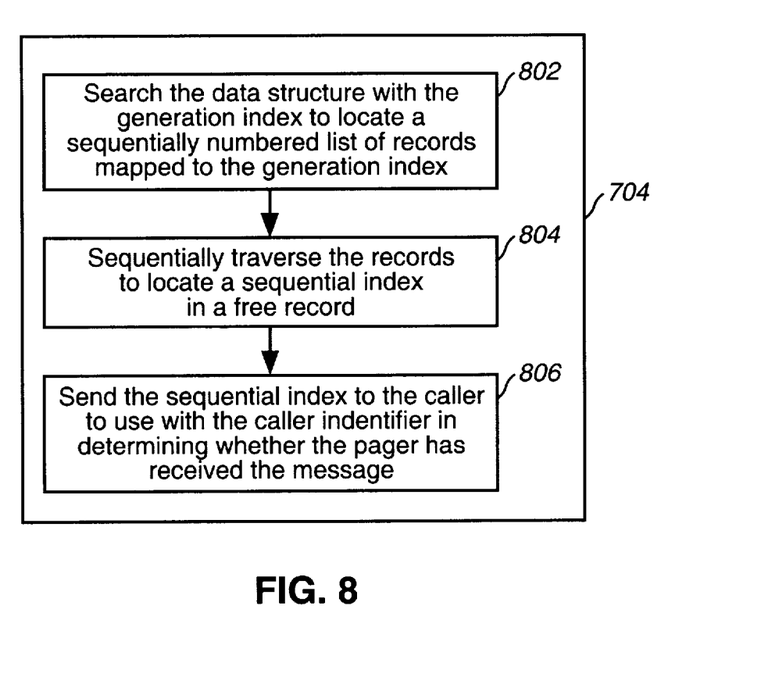
FIG. 8 is a flowchart illustrating how the present invention locates free storage space in a data structure to store information relating to a page confirmation request from the caller.
Figure 9:
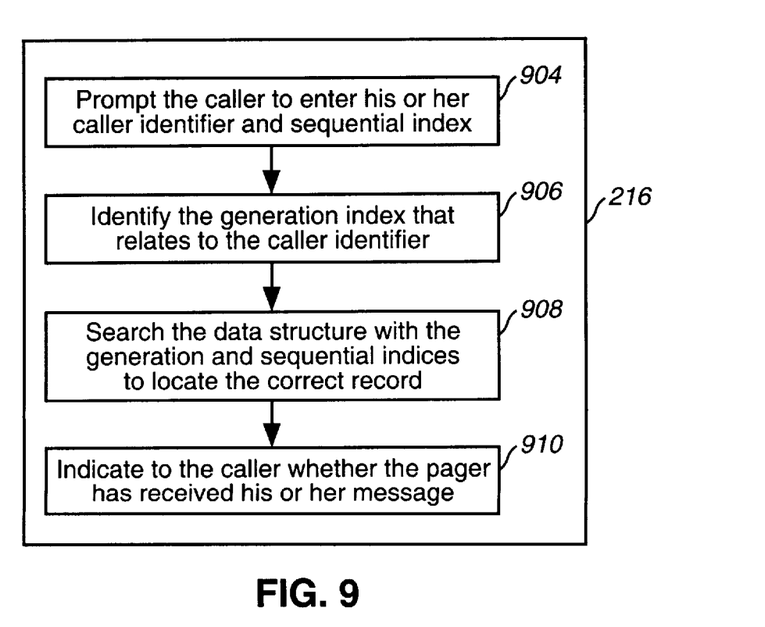
FIG. 9 is a flowchart illustrating how the present invention permits the caller to confirm receipt of a message by the pager.

FIG. 5 and FIG. 6 illustrate a preferred data structure to be used in the present invention. FIG. 7 through FIG. 9 illustrate how the preferred data structure is used to implement the invention.

FIG. 5 is a hash table data structure 500 illustrating a preferred embodiment of the present invention. The hash table 500 is stored at the paging terminal 108. The first index into the hash table 500 is the generation index 502. Each generation index 502 points to a sequentially numbered list of records 504. Each record 506 stores data used to confirm one caller's 102 page confirmation request.

FIG. 6 illustrates the detailed elements of a record 506 in FIG. 5. Each record 506 stores, at a minimum, its sequential index 602, the message text 604 (also called, simply, the message) and a confirmation flag 606. The sequential index 602 relates to the record's 506 position in the sequentially numbered list of records 504 and is the second index into the hash table 500. The confirmation flag 606 is used to indicate whether the pager 116 has confirmed receipt of the message. The confirmation flag 606 is set to 0 (or false) to indicate the pager 116 has not confirmed receipt of the message, and 1 (or true) to indicate the pager 116 has confirmed receipt of the message.

The page confirmation message is a combination of the numeric or text message representing the information the caller 102 is sending to the person carrying the pager 116, the sequential index 602, and the CRC 608 (calculated over the message and the sequential index 602). In other embodiments, the page confirmation message also includes the generation index 502.

The record 506 also preferably stores the CRC 608, and a time/date stamp 610. The time/date stamp 610 is information identifying the date and time that the record 506 was created.

The operation of step 206 of FIG. 2 is shown in a flowchart 700 of FIG. 7. In a step 702, the caller identifier is used to identify a generation index 502 in the hash table data structure 500. As discussed above, in the embodiment being discussed herein, the caller identifier of FIG. 4 is the caller's 102 first three letters of his last name converted to digits. The caller identifier, once converted into digits, match a generation index 502 in the hash table data structure 500.

In a step 704, the generation index 502 is used to locate a free record 506, and its sequential index 602, in the sequentially numbered list of records 504.

In a step 706, the page confirmation message is generated. Step 706 is preferably performed as follows. A CRC 608 is generated over the sequential index 602 and the message using any well known CRC algorithm. Then, the sequential index 602 and the CRC 608 are appended to the message to obtain the page confirmation message.

In a step 708, the sequential index 602, the message 604 and the confirmation flag 606 are stored in the record 506. Also in step 708, the CRC 608 and a time/date stamp 610 are stored in the record 506. The time/date stamp 610 is the date and time that the record 506 was created.

In a step 710, the confirmation flag 606 is initialized to 0 to indicate the pager 116 has not received the message.

The operation of step 704 is further described with reference to a flowchart 800 in FIG. 8. In a step 802, the hash table data structure 500 is searched using the generation index 502 to locate a sequentially numbered list of records 504 mapped to the generation index 502. In a step 804, the sequentially numbered list of records 504 is sequentially traversed to locate a sequential index 602 in a free record 506. In a step 806, the sequential index 602 is sent to the caller 102 to be used in conjunction with the caller identifier to determine whether the pager 116 received the message.

The following is an example of the operation of flowchart 700 in FIG. 7 and flowchart 800 in FIG. 8. The first caller 102, called "Katie Lee", decides she wants to send a page. Katie dials the pager's 116 number and enters her numeric message consisting of the digits '8144954082.' Katie is then prompted to enter the first three letters of her last name. As discussed above, each letter is mapped to a pre-defined digit. Typically, the service provider stores, at the paging terminal 108, a database representing the digits that each letter of the alphabet is mapped to. For illustration purposes, the letter 'L' is mapped to the digit '5,' the letter 'e' is mapped to the digit '3.'

For the first caller, Katie Lee, the digits '533' are stored as her caller identifier. Katie's caller identifier, now '533', is matched with a generation index 502 in the data structure 500 representing the same digits. As discussed above, each generation index 502 points to its own sequentially numbered list of records 504. A free record 506 needs to be located to store information relating to Katie's page confirmation request. The generation index 502, that Katie's caller identifier matches to, is used to locate a free record 506.

In order to locate a free record 506, each record 506 in the sequentially numbered list of records 504 corresponding to generation index 533 is looked at, in sequential order, to find the first free record 506. If all the records 506 are free, then the sequentially numbered list of records 504 will be sequentially traversed to locate the first record 506 having a sequential index 602 of '0000' illustrated in FIG. 5. Katie's sequential index 602 and CRC (calculated over this sequential index 602 and the message) are appended to her message to create a page confirmation message. Katie's message is now stored in the record 506 with the sequential index 506 of '0000.' The confirmation flag 606 in the record 506 is set to '0' to indicate the pager 116 has not confirmed receipt of the message from Katie. The sequential index 506 of '0000' is sent to Katie, to be used in conjunction with the first three letters of her last name, for checking in the future if the pager 116 received her message.

For further illustration, second caller 102 called "Carrie Lee" requests a page confirmation. Because both callers have the last day "Lee," Carrie's caller identifier represents the same digits as Katie's, the digits '533.' Therefore, Carrie's caller identifier is matched to the same generation index 502 as Katie's.

The only difference is when a free record 506 needs to be located to store information relating to Carrie's page confirmation request, the record 506 with sequential index '0000' will be looked at and then passed over because it is being used. Carrie's page confirmation request will be stored in the next free record 506 having the sequential index of '0001.'

The operation of the pager 116 upon receipt of the page confirmation message is as follows. The pager 116 extracts the sequential index 602 and the message from the page confirmation message. The pager 116 also extracts the CRC 608 from the page confirmation message. The pager 116 calculates a CRC over this extracted sequential index 602 and message. If this calculated CRC matches the extracted CRC, then the pager 116 knows that the page confirmation message was received without error. The pager 116 then opens a channel 118 and generates and sends back a confirmation message to the paging terminal 108. Preferably, this confirmation message includes the CRC and the sequential index 602. Upon receipt of this confirmation message, the paging terminal 108 updates the associated record in the database 500 with an indication that the page has been confirmed (step 214). The paging terminal 108 locates this record by using the sequential index 602 and the CRC contained in the confirmation message from the pager 116.

Other embodiments are possible. For example, where the page confirmation message includes both the generation index 502 and the sequential index 602, the pager 116 can return both the generation index 502 and the sequential index 602. The paging terminal 108 then uses the generation index 502 and the sequential index 602 to locate and update the record in the database 500.

Flowchart 902 in FIG. 9 indicates how a caller may determine whether his page has been received. At any point after the caller 102 has requested page confirmation, the caller 102 may check on the status of his message by using the caller identifier and sequential index 602. The caller 102 may access the paging terminal 108 in any number of ways depending on the service provider's implementation, such as:

1) dialing a predefined number (e.g., 1-800-CONFIRM);
2) dialing the service provider access number (e.g., 1-800-PAGE-MCI); or
3) dialing the unique pager number.

In a step 904, the caller 102 is prompted to enter his caller identifier and sequential index 602 into the input source 104. In a step 906, the caller identifier is matched to the corresponding generation index 502 in the hash table 500. In a step 908, the hash table 500 is searched with the generation index 502 and the sequential index 602 to locate the correct record 506. In a step 910, the caller 102 is told whether the pager 116 has received his message. For instance, if the confirmation flag 606 is set to 1, then the paging terminal 108 will indicate to the caller 102 that his message was received by the pager 116. If the confirmation flag 606 is set to 0, then the paging terminal 108 will indicate to the caller 102 that the pager 116 did not receive his message.

At some later time as preferably measured against the time/date stamp 610, the sequential index 602 in the record 506 may be cleared to indicate that the record 506 is free to be used in another page confirmation request.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What Is claimed Is:

1. A method for confirming receipt to a caller of a caller's message by a message reception unit from a communication terminal, the method comprising the steps of:
   (1) receiving a message confirmation request from said caller, said message confirmation request including a message for a called party;
   (2) storing information relating to said message confirmation request in a record of a data structure, said data structure having an index;
   (3) providing said index to said caller for use in confirming whether the message reception unit received the message;
   (4) receiving confirmation from the message reception unit that the message was received by the message reception unit without interaction by the called party;
   (5) indicating said receipt of confirmation in said record; and
   (6) permitting said caller to access said record to confirm whether the message reception unit received the message using said index.

2. The method of claim 1, further comprising a step after step (1) of:
   billing said caller for selecting message confirmation.

3. The method of claim 1, wherein step (1) comprises the steps of:
   (a) prompting said caller to select message confirmation;
   (b) determining whether said caller has selected message confirmation; and
   (c) if said caller has selected message confirmation, then prompting said caller to enter a caller identifier.

4. The method of claim 3, wherein step (c) comprises the steps of:
   (I) prompting said caller to enter one or more letters representative of said caller identifier;
   (II) converting said one or more letters into digits; and
   (III) storing said converted one or more letters as said caller identifier.

5. The method of claim 3, wherein step (2) comprises the steps of:
   (I) using said caller identifier to identify a generation index in said data structure;
   (II) using said generation index to locate a sequential index in said record;
   (III) appending at least said sequential index to the message to create a message confirmation message;
   (IV) storing at least said sequential index, the message and a confirmation flag in said record; and
   (V) initializing said confirmation flag to indicate the message reception unit has not received the message.

6. The method of claim 5, wherein step (II) comprises the steps of:
   searching said data structure with said generation index to locate a sequentially numbered list of said records mapped to said generation index; and
   sequentially traversing said records to locate a free record.

7. The method of claim 5, where step (3) comprises the step of:
   sending said sequential index to said caller to use with said caller identifier in determining whether the message reception unit has received the message.

8. The method of claim 5, wherein step (4) comprises the steps of:
   (i) sending said message confirmation message to the message reception unit;
   (ii) determining whether the message reception unit has confirmed receipt of said message confirmation message; and
   (iii) if the message reception unit has not confirmed receipt of said message confirmation message and a timeout has been exceeded, then repeating step (i).

9. The method of claim 5, wherein step (5) comprises the steps of:
   searching said data structure with at least said sequential index to locate a match; and
   if said match is found, then setting said confirmation flag to indicate the message reception unit has received the message.

10. The method of claim 5, wherein step (6) comprises the steps of:
    (i) prompting said caller to enter said caller identifier and said sequential index;
    (ii) using said caller identifier to identify said generation index in said data structure; and
    (iii) searching said data structure with said generation index and said sequential index to locate a corresponding record.

11. The method of claim 10, wherein step (6) further comprises the step of:
    (iv) indicating to said caller that the message reception unit has received the message if said confirmation flag is set to indicate the message reception unit has received the message.

12. The method of claim 10, wherein step (6) further comprises the step of:

(iv) indicating to said caller that the message reception unit has not received the message if said confirmation flag is set to indicate the message reception unit has not received the message.

13. A system for confirming receipt to a caller of a caller's message by a message reception unit from a communication terminal, comprising:

message confirmation request receiving means for receiving a message confirmation request from a caller, said message confirmation request including the message;

message confirmation request storing means for storing information relating to said message confirmation request in a record of a data structure, said data structure having an index;

index providing means for providing said index to said caller for use in confirming whether the message reception unit received the message;

confirmation receiving means for receiving confirmation from the message reception unit that the message was received without interaction by the called party;

confirmation indicating means for indicating said receipt of confirmation in said record; and permitting means for permitting said caller to access said record to confirm whether the message reception unit received the message.

14. The system of claim 13, further comprising:

means for billing said caller for selecting message confirmation.

15. The system of claim 13, wherein said message confirmation request receiving means comprises:

means for prompting said caller to select message confirmation;

means for determining whether said caller has selected message confirmation; and caller identifier prompting means for prompting said caller to enter a caller identifier if said caller has selected message confirmation.

16. The system of claim 15, wherein said caller identifier prompting means comprises:

means for prompting said caller to enter one or more letters representative of said caller identifier;

means for converting said one or more letters into digits; and means for storing said converted one or more letters in said caller identifier.

17. The system of claim 15, wherein said message confirmation request storing means comprises:

means for using said caller identifier to identify a generation index in said data structure;

sequential index locating means for using said generation index to locate a sequential index in said record;

means for appending at least said sequential index to the message to create a message confirmation message;

means for storing at least said sequential index, the message and a confirmation flag in said record; and means for initializing said confirmation flag to indicate the message reception unit has not received the message.

18. The system of claim 17, wherein said sequential index locating means comprises:

means for searching said data structure with said generation index to locate a sequentially numbered list of said records mapped to said generation index; and means for sequentially traversing said records to locate a free record.

19. The system of claim 17, wherein said index providing means comprises:

means for providing said sequential index to said caller to use with said caller identifier in determining whether the message reception unit has received the message.

20. The system of claim 17, wherein said confirmation receiving means comprises:

message confirmation sending means for sending said message confirmation message to the message reception unit;

returning means for determining whether the message reception unit has returned confirmation of receipt of said message confirmation message; and means for causing repeated operation of said message confirmation sending means if a timeout expires before said confirmation is returned.

21. The system of claim 17, wherein said confirmation indicating means comprises:

means for searching said data structure with at least said sequential index to locate a match; and means for setting said confirmation flag to indicate the message reception unit has received the message if said match is found.

22. The system of claim 17, wherein said permitting means comprises:

means for prompting said caller to enter said caller identifier and said sequential index;

means for using said caller identifier to identify said generation index in said data structure; and means for searching said data structure with said generation index and said sequential index to locate a corresponding record.

23. The system of claim 22, wherein said permitting means further comprises:

means for indicating to said caller that the message reception unit has received the message if said confirmation flag is set to indicate the message reception unit has received the message.

24. The system of claim 22, wherein said permitting means further comprises:

means for indicating to said caller that the message reception unit has not received the message if said confirmation flag is set to indicate the message reception unit has not received the message.

* * * * *